United States Patent

[11] 3,623,035

[72] Inventors Seihin Kobayashi;
Michihiro Torii; Masanori Kurahashi, all of Shizuoka Prefecture, Japan

[21] Appl. No. 792,447
[22] Filed Jan. 21, 1969
[45] Patented Nov. 23, 1971
[73] Assignee Fuji Denki Kabushiki Kaisha
Tokyo, Japan
[32] Priority Feb. 2, 1968
[33] Japan
[31] 43/6031

[54] MAGNETIC MEMORY MATRIX AND PROCESS FOR ITS PRODUCTION
7 Claims, 9 Drawing Figs.

[52] U.S. Cl. .......... 340/174 BC,
340/174 PW, 340/174 VA, 340/174 VC
[51] Int. Cl. .......... G11c 5/04,
G11c 11/02
[50] Field of Search .......... 340/174
VA, 174 BC, 174 PW, 174 VC

[56] References Cited

UNITED STATES PATENTS

| | | | |
|---|---|---|---|
| 2,926,342 | 2/1960 | Rogers .......... | 340/174 |
| 3,460,113 | 8/1969 | Maeda .......... | 340/174 |
| 3,470,545 | 9/1969 | Bonyhard .......... | 340/174 |

*Primary Examiner*—James W. Moffitt
*Attorney*—Eliot S. Gerber

ABSTRACT: A magnetic memory matrix is composed of a plurality of tubes of ferrite material and a magnetic keeper. Depressions on the surface of the keeper hold the ferrite tubes and other depressions define bit areas, the two groups of depressions intersecting at right angles with each other and the depressions of each group being substantially in parallel alignment. Word wires are arranged in parallel lines between those depressions defining bit areas, and a bit wire and a sense wire are threaded through each ferrite tube. The depressions defining the bit areas effectively define the flux paths around the word wires.

The process for making the magnetic keeper comprises (1) mixing fine fired ferrite particles with an organic binder, i.e. a solution of thermoplastic, (2) pressing and forming a board from the mixture, and (3) forming the two kinds of depressions on the board.

INVENTORS:
SEIHIN KOBAYASHI
MICHIHIRO TORII
MASANORI KURAHASHI
By: Elvis S. Gerber
ATTORNEY.

INVENTORS:
SEIHIN KOBAYASHI
MICHIHIRO TORII
MASANORI KURAHASHI
BY: Elliot S. Gerber
ATTORNEY INVENTORS:
SEIHIN KOBAYASHI
MICHIHIRO TORII
MASANORI KURAHASHI
By:
Eliot S. Gerber
ATTORNEY

MAGNETIC MEMORY MATRIX AND PROCESS FOR ITS PRODUCTION

BACKGROUND OF THE INVENTION

This invention relates to an improved magnetic memory matrix in which the magnetic fields are formed by perpendicularly crossed electrical elements and to the process for making its magnetic keeper.

Magnetic memory devices are used in electrical computers and other electronic data processing equipment. They are, generally, constructed from a plurality of magnetic memory planes. Each magnetic memory plane includes multiple discrete magnetic memory elements arranged in rows and columns, for example ferrite doughnut-shaped cores, and drive and sense wires threaded through each element. In a magnetic memory plane constructed from such discrete memory elements, each element must individually be formed and fired, and thereafter arranged on the plane in a matrix and strung with wires.

The rapidly developing technology of electronic data-processing equipment requires that their memory devices become faster in operation and greater in capacity, resulting in a demand that the memory element be made smaller. However, it is apparent that not only the art of making the memory element but also the operation of threading wires through each element becomes more difficult as the elements are made smaller.

Recently, in order to alleviate these problems, various types of magnetic memory matrices and magnetic memory lines, containing multiple bits, are being actively developed. These techniques, called "batch fabrication techniques," are used to produce the multiaperture memory, laminated memory, flute memory, wire memory, and other types of memory devices. In a magnetic memory matrix, or magnetic memory line, constructed by the batch fabrication technique, multiple memory elements are systematically arranged into a uniform and continuous board or rod made of materials having characteristics of the rectangular magnetic hysteresis loop.

When the adjacent bits are arranged closely to each other, each bit will be influenced by the magnetic field generated around the adjacent element. As a result, the state of remanent flux is influenced and stored information may creep and be destroyed. It is consequently necessary to provide a magnetic circuit for reducing the demagnetization arising from the magnetic connection of the magnetic flux which develops around the adjacent bit elements.

SUMMARY OF THE INVENTION

An objective of the present invention is to provide an improved magnetic memory matrix wherein (1) the magnetic flux around a bit element does not interact with its adjacent magnetic flux; (2) unnecessary magnetized areas are reduced as small as possible; and (3) the number of bit elements contained in the same matrix is increased.

It is another objective of the present invention to provide processes for making such improved magnetic keeper.

These objectives are accomplished by providing depressions on the magnetic keeper so as to define areas of the magnetic field created around word wires and thereby reduce the needless magnetized area as small as possible.

For a better understanding of the invention as well as further objectives and features thereof, reference is made to the following detailed description, to be read in conjunction with the accompanying drawings wherein like figures are presented by like reference numerals.

BRIEF DESCRIPTION OF THE DRAWINGS

In the drawings:

FIG. 1*a* is a structural perspective exploded view of the magnetic memory matrix prior to its construction.

FIG. 1*b* is an enlarged vertical sectional view and FIG. 1*c* is an enlarged side sectional view of a part of the magnetic memory matrix containing the tubular memory component and wires.

FIG. 2 is a perspective exploded view showing an embodiment according to the present invention.

DESCRIPTION

FIG. 1 explains phenomenon with which the present invention is concerned. The tubular magnetic memory matrix is composed of many tubular magnetic memory components and is made by the batch fabrication technique. The tubular memory components have the deficiencies which result from that process. In FIG. 1 a tubular magnetic memory component 1 is made of ferrite material having a rectangular hysteresis characteristic. The tubular magnetic memory component 1 involves multiple memory cells. A magnetic keeper 3 is made from a soft magnetic material having very high magnetic permeability or from a nonlinear ferrite material having a rectangular hysteresis characteristic. A plurality of depressions or grooves 4 are provided on the surface of the keeper 3. The depressions 4 serve the function of holding the tubular components, positioning the wires for the word drive lines, and preventing interaction between memory cells.

Figure 1A:
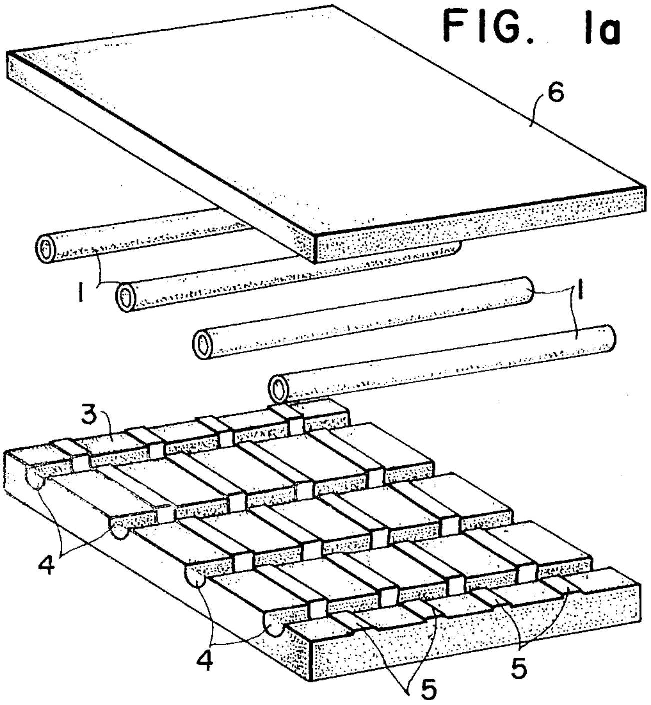
FIG. 1*a* to FIG. 1*c* shows a magnetic memory matrix, including a plurality of tubular magnetic memory components.
Figure 1B:
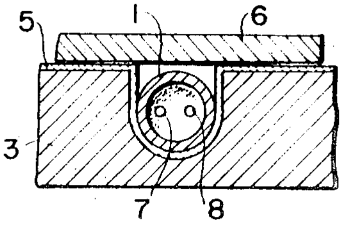
Figure 1C:
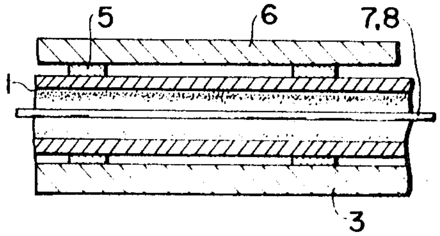
Figure 1D:
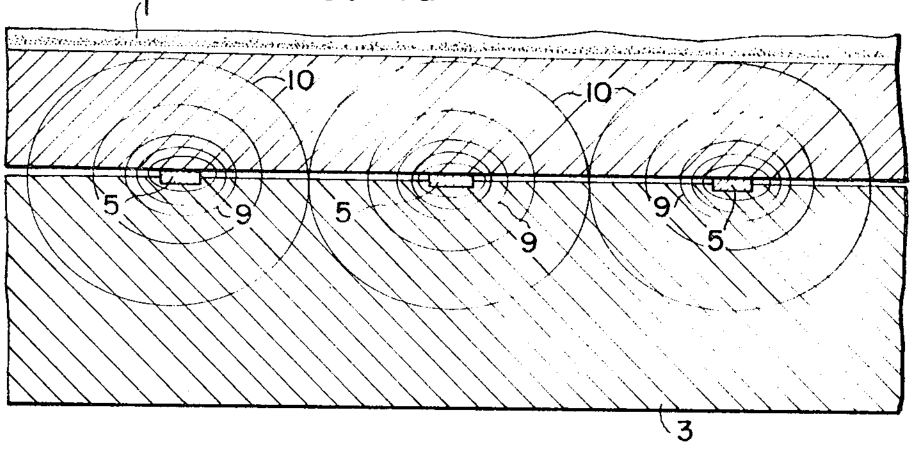
FIG. 1*d* shows magnetic field around the word wire when energized.

The word wires 5 are arranged to intersect at substantially right angles with the depressions 4, at the same intervals as those of the bit elements. An upper magnetic keeper 6 covers the lower magnetic keeper 3. When a sense wire and a bit wire are threaded through each tubular magnetic memory component and they are positioned as shown in FIG. 1*b* and FIG. 1*c*, bits of information are written in by means of coincident-current drive. At the selected bit element, a magnetic field 9 is created around the word wire as shown in FIG. 1*d*, the field created being strong enough to reverse the orientation of remanent flux (representing information) stored in the bit element. A magnetic field 10 is also created outside the magnetic field 9. The field 10 is not strong enough to reverse the orientation of the remanent flux, but may adversely affect the remanent flux. Comparing the magnetic field 9 and the other magnetic field 10 created outside of it, the magnetic field 10 is occasionally scores of times larger than that of field 9. Due to this, the magnetic field 10, around the word wire, may be affected by the adjacent magnetic field 10 around the adjacent word wire. When they interact with each other, interaction between the remanent fluxes may appear to have arisen between them.

The magnetic field 10 is of no use and it is desirable to reduce the area of the magnetic field 10 as small as possible. If the intervals between adjacent word wires are made wider, in order to prevent the interaction of the fluxes created around the respective adjacent word wires, the number of bit elements contained in the same plane is decreased and such wider intervals may have a bad effect upon drive pulse characteristics.

Figure 2A:
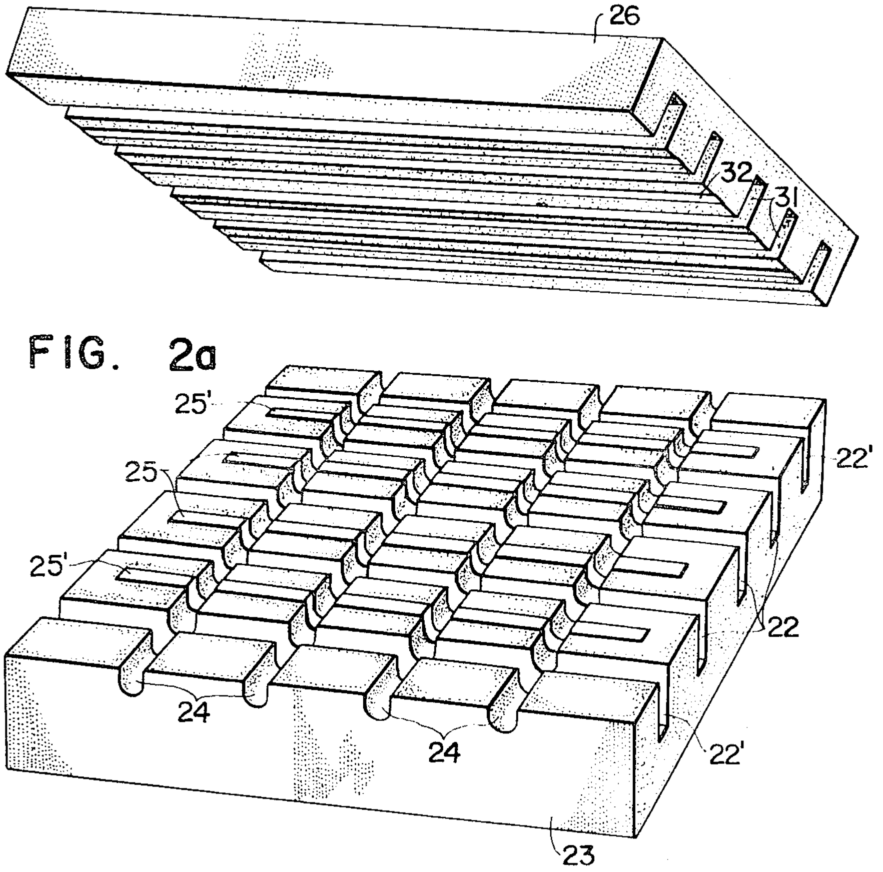
FIG. 2*a* is a structural perspective view of the same embodiment.
Figure 2B:
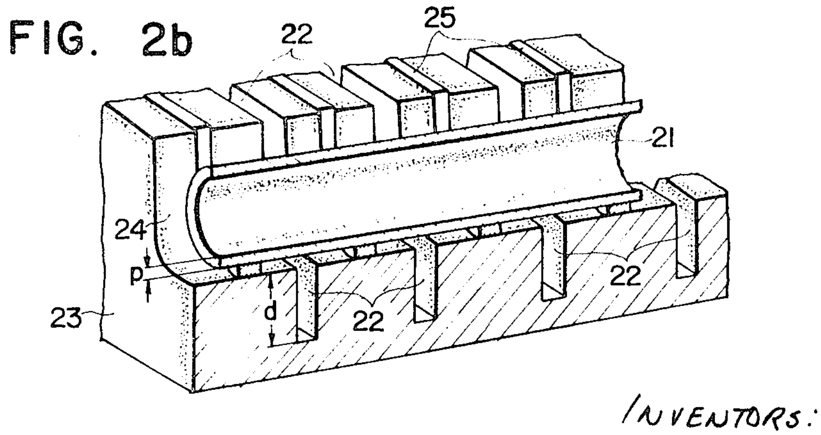
FIG. 2*b* is a side perspective view, partially cut away, of a portion of the same embodiment.
Figure 2C:
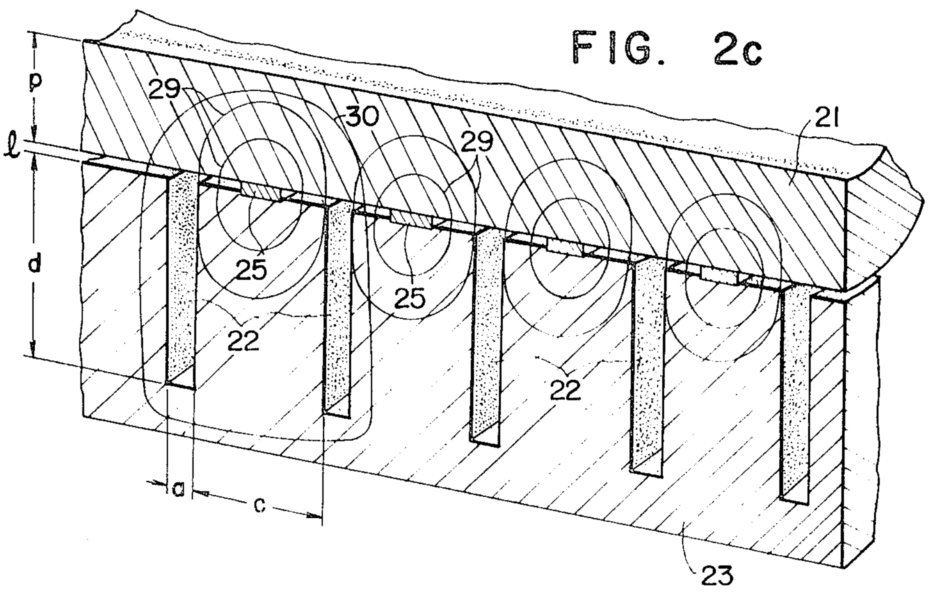
FIG. 2*c* is a sectional view of the same embodiment showing flux closure path around the word wires when energized.

FIGS. 2*a* through 2*c* show the preferred embodiment of the present invention.

In FIG. 2*a*, a magnetic keeper 23 is made of soft magnetic material and has many depressions (slots) 24 on its surface. The depressions 24 hold tubular magnetic memory components 21 which have rectangular hysteresis characteristics. Other depressions 22 of a different direction are also provided on the keeper 23. The depressions 22 intersect substantially at right angles with said depressions 24. The depressions 22 are on both sides of the word wires and parallel to them. The depressions 22 are provided so as to define bit areas. The writing operation is the same as in conventional magnetic memories, that is, bit current is applied in coincidence with word current to a selected bit element and, as a result, the magnetic field created by these coincident currents reverses the remanent flux orientation. The change in flux orientation represents information stored in the bit element.

In the magnetic memory matrix according to this invention, the depressions 22 (for the defining bit area) are provided, as shown in FIG. 2*a* to FIG. 2*c*, on the keeper. A flux closure path 30, which would interact with the adjacent flux around the adjacent word wire in the absence of depressions 22, is forced to take the path shown in FIG. 2*c* when currents are applied. The area of magnetic field 29, in which the remanent flux is reversed in its orientation, spreads over almost the entire area between the two depressions 22 around the word wire 25. Choosing suitable width (*a*) and depth (*d*) of the depressions 22, it is possible to reverse the orientation of the remanent flux positively at the area 29, where the remanent flux is desired to be reversed in its orientation, without creating a magnetic field 30 outside the said area 29. The depressions 22 are so arranged that interaction of the flux with the adjacent flux may be eliminated. Even if such interaction occurs, it will have little effect on the adjacent remanent flux. To accomplish these goals positively, width (*a*) of the depressions is provided, preferably, to be wider than gap (1) between keeper 23 and tubular magnetic memory component 21 and depth (*d*) is provided, preferably, to be thicker than thickness (*p*) of the tubular magnetic memory component 21. The sectional view of the depression 22, which is at right angles with the lengthwise direction thereof, is shown as having a rectangular shape in FIG. 2*b*, but it may take a wedge shape or other shape.

In FIG. 2*a*, word wires 32″ and depressions 22″ are provided in an upper magnetic keeper 26, which is a cover over the lower keeper 23, corresponding with the word wires 25 and depressions 22 of the keeper, respectively, and so arranged that the objectives of the present invention will be accomplished more effectively.

Figure 3A:
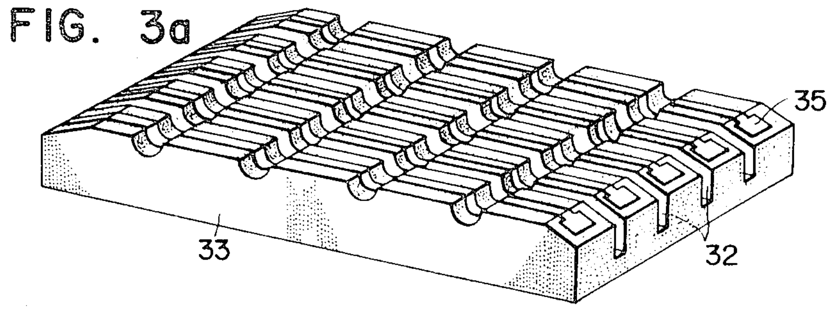
FIG. 3 is a perspective view of another embodiment of the present invention.
Figure 3B:
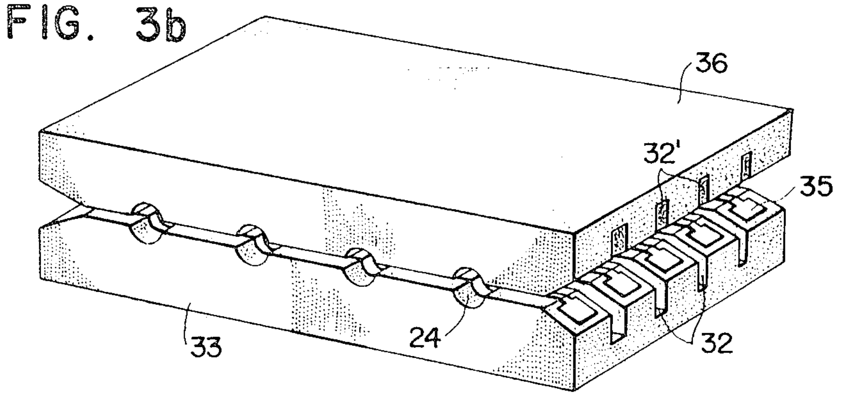

Further, as shown in FIG. 3, the upper magnetic keeper 36 may be provided with other depressions 24 on the interface thereof intersecting substantially at right angles with depressions 32′ to hold the tubular magnetic components cooperating with depressions 24 on the magnetic keeper 33. In FIG. 3 reference numeral 32′ shows depressions for defining the magnetic fields created around bit elements cooperating with corresponding depressions 32 on the keeper 33.

While the invention has been particularly shown and described with reference to the preferred embodiments of tubular magnetic memory components, it is not limited thereto and may be also applied to a magnetic memory matrix of the type having perpendicular field driving, such as a wire memory and a thin film memory, and to a magnetic memory matrix including monolithic and discrete memory elements.

The process according to this invention for making the magnetic keeper for the magnetic memory matrix will now be described. The starting materials for the keeper are "green" ferrite powder and an organic binder of a thermoplastic. The "green" ferrite powder is a ferrite composition which has been fired and thereby having a linear or nonlinear magnetic characteristic. The preferably organic binder of thermoplastic is a vinyl resin. These two materials are mixed together. The mixture is then pressed to form a thick and homogeneous "green" ferrite sheet by means of hot-rolling. In order to make depressions 24 and other depressions 22, which are intersected at right angles with each other on the sheet, a hot-roll or hot-press is used.

The keeper made by these steps is used as it is or alternatively it is sintered at a temperature of about 1,200° C. The sintered keeper has higher magnetic permeability compared with the keeper which is not sintered.

The process of the present invention provides a keeper of higher density than is obtained by producing the keeper by means of a doctor blade, that is, by spreading a ferrite slurry. The present process reduces crack or outline distortion of the keeper as it contains binder of suitable plasticity.

Three embodiments (examples) of the process of the present embodiment follow.

The first embodiment of the process:

Material for the keeper is in the proportion of 100 grams of green ferrite powder, 4.5 grams of polyvinyl alcohol, as the binder, 4.8 grams of glycerine as the plasticizer, and 30 grams of water as the solvent. These materials are mixed in a mixer. This mucilaginous mixture is heated to a temperature between 80° and 90° C. by means of a hot roller. The solvent evaporates and the mixture is rolled to form a ferrite sheet, having plasticity, as thick as 3 millimeters. Depressions 22 and the other depressions 24 are formed, respectively, on the surface of the magnetic ferrite sheet by means of hot rollers which have respective projections corresponding to the respective depressions 22 and 24. The magnetic keeper formed by these steps is used as it is but when higher magnetic permeability is desired, after burning out the binder, the ferrite keeper may be sintered at a temperature in the range of 1,200° to 1,300° C.

The second embodiment of the process:

So far as the magnetic ferrite sheet to be used in this embodiment is concerned, the same thick flat ferrite sheet as that of formed by the first embodiment is used. Respective depressions 22 and 24 are formed respectively on the surface of the magnetic ferrite sheet by means of a hot-press (a pressure press having a heated platen) which has respective projections corresponding to these depressions. The temperature of this hot-press is about 100° C. and the pressure is about 50 kg./cm.$^2$.

The third embodiment of the process:

The mixture is made in accordance with the same step in the first embodiment and formed into pellets having the size of 25 mesh pass. A thick green ferrite sheet is formed and, thereafter, respective depressions are formed on the sheet by means of the same hot-press as that of the second embodiment.

Although the invention has been described with reference to particular embodiments thereof, these may be modified in various ways without departing from the scope of the claims.

What is claimed is:

1. A magnetic memory matrix comprising:

a. a keeper 23 made of magnetic material having high magnetic permeability;

b. a plurality of elongated magnetic memory components;

c. a first plurality of depressions 24 arranged substantially in parallel with each other and aligned in one direction in the surface of said keeper, for holding said magnetic memory components therein;

d. a plurality of word wires 25 arranged within said keeper and intersecting with said magnetic memory components;

e. a sense wire and a digit wire threaded through each of the said magnetic memory components; and f. a second plurality of depressions 22 which are substantially parallel with each other and aligned in another direction from the alignment of the first plurality of depressions, the second depressions being on both sides of said word wires 25 on the keeper 23 and intersecting with said depressions 24 for defining magnetic flux paths around memory cells.

2. The magnetic memory matrix of claim 1, wherein said magnetic memory components are selected from the group consisting of components in the shape of tubes, plate bars, rods, and plated thin-film wires.

3. The magnetic memory matrix of claim 1, wherein said magnetic material of said keeper is selected from the group of materials having nonlinear magnetic characteristics and soft magnetic material characteristics.

4. The magnetic memory matrix of claim 1, wherein each of the said depressions 22 for defining magnetic flux paths have a width which is slightly greater than the gap between the magnetic memory components and the keeper 23 and a depth which is slightly thicker than the thickness of the magnetic memory component.

5. A magnetic memory matrix comprising:

a. a lower magnetic keeper 23 made of magnetic material having a high magnetic permeability;

b. a plurality of elongated magnetic memory components;

c. an upper magnetic keeper 26 covering said magnetic keeper 23;

d. a first plurality of depressions 24 arranged substantially parallel and aligned in one direction on the surface of said lower keeper, for holding said magnetic memory components therein;

e. a first plurality of word wires 25 arranged on the surface of said lower keeper defining intervals of memory cells and intersecting with said magnetic memory components;

f. a sense wire and a digit wire threaded through each of the said magnetic memory components;

g. a second plurality of word wires 32 arranged in the upper magnetic keeper 26 on its interface, the positions of the wires 26 corresponding with said word wires 25;

h. a second plurality of depressions 22 which are substantially parallel to each other and aligned in another direction relative to the first said plurality of depressions, said second depressions being both sides of said word wires 25 on the keeper 23 intersecting with said depressions 24 for defining magnetic flux paths around said memory cells; and i. a plurality of depressions 31 in said upper magnetic keeper 26 which are substantially parallel to each other, said upper depressions 31 corresponding in alignment and going with said second plurality of depressions 22 on said keeper 23, for defining more effectively the magnetic flux paths around said memory cells.

6. A magnetic memory matrix of claim 5, wherein said word wires 32 provide return flux paths for the said word wires 25 of said keeper 23.

7. A magnetic memory matrix comprising:

a. a lower keeper 33 made of magnetic material having a high magnetic permeability;

b. a plurality of elongated magnetic memory components;

c. an upper magnetic keeper 36 covering said lower magnetic keeper 33;

d. a first plurality of substantially parallel depressions 24 arranged in one direction in the surface of said lower keeper 33 for holding said magnetic memory components therein;

e. word wires 35 arranged, corresponding with the intervals of memory cells, to intersect with said magnetic memory components and on the surface of said lower keeper 33;

f. a sense wire and a digit wire threaded through each magnetic memory component;

g. word wires arranged on the surface of said upper magnetic keeper 36 corresponding in position with said word wires 35 and at the interface of the two keepers;

h. a second plurality of substantially parallel depressions 32 provided in another direction relative to said first depressions and on both sides of said word wires 35 on the keeper 33; said second depressions intersecting with said first depressions 24 for defining magnetic flux paths around said memory cells;

i. a first group of substantially parallel depressions 32′ provided in said upper magnetic keeper 36, corresponding in position with depressions 32 on the said keeper 33 and extending to the interface of the two keepers for defining more effectively magnetic flux paths around said memory cells; and j. a second group of substantially parallel depressions 24 on the interface of said upper magnetic keeper 36 intersecting with said depressions 32′ for holding said magnetic memory components.

* * * * *